US006192930B1

(12) United States Patent
Källberg et al.

(10) Patent No.: US 6,192,930 B1
(45) Date of Patent: Feb. 27, 2001

(54) VALVE DEVICE

(75) Inventors: Lars Källberg, Finspång; Frank Schliephacke, Norrköping, both of (SE)

(73) Assignee: Abb Stal AB, Finspang (SE)

( * ) Notice: Subject to any disclaimer, the term of this patent is extended or adjusted under 35 U.S.C. 154(b) by 0 days.

(21) Appl. No.: 09/355,453

(22) PCT Filed: Feb. 9, 1998

(86) PCT No.: PCT/SE98/00222

§ 371 Date: Jul. 28, 1999

§ 102(e) Date: Jul. 28, 1999

(87) PCT Pub. No.: WO98/35138

PCT Pub. Date: Aug. 13, 1998

(30) Foreign Application Priority Data

Feb. 10, 1997 (SE) .................................................. 9700449

(51) Int. Cl.[7] ...................................................... F16K 11/20

(52) U.S. Cl. ................ 137/597; 137/599.14; 137/601.17

(58) Field of Search .................................... 137/597, 594, 137/599.11, 599.14, 601.16, 601.17

(56) References Cited

U.S. PATENT DOCUMENTS

| | | |
|---|---|---|
| 4,715,581 | 12/1987 | Myers . |
| 4,860,535 | 8/1989 | MÅnsson et al. . |
| 5,694,762 | 12/1997 | Wada . |

FOREIGN PATENT DOCUMENTS

| | | |
|---|---|---|
| 0721062 | 7/1996 | (EP) . |
| 2520833 | 8/1983 | (FR) . |
| 456757 | 10/1988 | (SE) . |

*Primary Examiner*—John Fox
(74) *Attorney, Agent, or Firm*—Pollock, Vande Sande & Amernick, RLLP

(57) ABSTRACT

A valve (8) is fitted into a channel arrangement having a first inner channel (1) which extends longitudinally carrying a first fluid. An outer channel (4) encloses channel (1) and is intended for the passage of a second fluid at a lower temperature. The valve assembly has at least two valves to control flow through the outer channel (4).

The outer channel (4) is made up of two. U-shaped channel portions (12,13) each extending outwardly with regard to the inner channel (1). Each of the channels (12,13) has at least one of said first valves (9) to control fluid flow and the inner channel (1) may have another valve (10) to control it's flow.

21 Claims, 6 Drawing Sheets

VALVE DEVICE

THE BACKGROUND OF THE INVENTION AND PRIOR ART

The present invention refers to a valve device according to the precharacterizing portion of claim 1.

It is known to use such valve devices in connection with a combustion plant comprising a pressurized fluidized bed, a so called PFBC-plant (Pressurized Fluidized Bed Combustion). Such plants may comprise a gas turbine for extracting energy from the pressurized, hot combustion gases produced in the bed, and the compressed combustion air required at the combustion may be supplied to the bed via an air channel which has an annular cross-section and encloses the hot gas channel conveying the combustion gases from a combustion chamber to the gas turbine. Furthermore, it is known to provide such channels with a valve device which in the case of a gas turbine trip, i.e. that the gas turbine has to be stopped quickly, isolates the gas turbine from the pressure vessel.

SE-B-456 757 discloses such a valve device which is intended to be used in a PFBC-plant. The known valve device comprises two throttle valves which are provided one after the other in the hot gas channel and which are rotatable about a respective rotational axis. Furthermore, it comprises four cone valves which are distributed around the periphery of the air channel and which are intended to intercept the annular air channel and concurrently open a connection between the annular air channel and the hot gas channel. These four cone valves are provided in parallel, i.e. all four of them are to function in order to intercept the flow through the air channel. Although this known valve device has functioned satisfactorily in the plants where it is mounted today, it is connected with certain problems appearing in particular by the construction of very large combustion plants. Furthermore, these cone valves require powerful adjustment members for their operation and a valve spindle guiding which is provided in direct connection to the hot gas, which results in the problem of jamming of the valve. Another problem connected to this known valve device is that it comprises a large and complicated casting. Such castings are not possible to manufacture at least not to justifiable costs in the case of large plants having great flows. In addition, the known valve device comprises a fairly complicated flow path which results in high pressure drops at least with respect to the air channel.

EP-A-721 062 discloses such a valve device intended for a PFBC-plant. In this case, the whole valve device including all three valve functions is arranged in a common valve housing having significant dimensions. As appears from this document, the gas turbine and the compressor are provided above said valve housing. Furthermore, all three valve functions are depending on one adjustment member and provided on a common shaft. From a security point of view, this known valve device thus has a very small redundancy.

SUMMARY OF THE INVENTION

The object of the present invention is to provide a valve device by which the problems discussed above may be remedied.

This object is obtained by the valve device initially defined and characterized in that the outer channel comprises two U-shaped channel portions, each extending outwardly with regard to the inner channel and each comprising at least one of said first valves. By such a valve device, a relatively compact construction with a low height is possible although the valve device is intended for large plants. By the provision of at least two U-shaped channel portions, it is possible to avoid thermal deformation of the valve device. Thereby, the U-shaped channel portions are advantageously provided symmetrically with regard to the inner channel.

According to an embodiment of the present invention, at least one of said first valves comprises a valve disc which is rotatable about a rotational axis extending through the intermediate pipe portion. Such rotatable valve discs or so called throttle valves may, in comparison with axially displaceable cone valves, be manufactured in a simple manner and be operated by means of small and relatively simple adjustment members.

According to a further embodiment of the present invention, each channel portion comprises two pipe portions, which extend outwardly with regard to the inner channel, and an intermediate pipe portion, which connects the pipe portions extending outwardly. Thereby, the two pipe portions extending outwardly may extend in a direction forming an essentially right angle to the longitudinal direction of the inner channel. Furthermore, the intermediate pipe portions may advantageously extend in a direction being essentially parallel to the longitudinal direction of the inner channel.

According to a further embodiment of the present invention, a closure wall is provided in the outer channel between the two, outwardly extending pipe portions of each U-shaped channel portion, said closure wall advantageously having a conical shape. Such a conical shape enables a strength connection and permits a movement of the inner channel in relation to the outer channel due to temperature differences.

According to a further embodiment of the present invention, the inner channel and the outer channel are separated by a wall comprising an outer wall element and an inner wall element. Since the outer channel is arranged to convey the second fluid at pressure which is higher than the pressure of the inner channel, the outer wall element may advantageously be arranged to absorb the pressure difference existing between the inner channel and the outer channel. Furthermore, the inner wall element may be arranged to form a protective layer against the fluid in the inner channel and a heat-insulating layer may be provided between the inner and the outer wall elements. In order to avoid thermal tensions, the inner wall element may thereby be connected to the outer wall element by means of a connection permitting movements of the inner wall element in relation to the outer wall element.

According to a further embodiment of the present invention, at least a second valve is provided to enable the interception of a flow through the inner channel. Furthermore, at least a third valve may be arranged to open a connection between the outer channel and the inner channel and provided upstream of said first valves in the outer channel and downstream of said second valve in the inner channel.

According to a further embodiment of the present invention, at least one of said first valves comprises a valve disc which is rotatably journalled in said intermediate pipe portion by means of a first and a second shaft pin. By the first pin being fixedly attached to the valve disc and the second shaft pin being loosely attached to the valve disc, the mounting of the valve disc in the intermediate pipe portion is possible without the need of any axial partition plane and at the same time the valve disc may be designed in a favourable manner for the flow. Thereby, the first shaft pin and the valve disc may be manufactured in one piece and the valve disc may comprise a recess in which the second shaft pin is insertable.

According to a further embodiment of the present invention, at least one of said first and second valves comprises two valve discs provided one after the other and each comprising a depression, each depression being arranged to engage the depression of the other valve disc when the valve discs are located in their open positions. By such depressions, it is possible to reduce the flow resistance emanating from the valve discs.

BRIEF DESCRIPTION OF THE DRAWINGS

The present invention is now to be explained more closely by means of different embodiments and with reference to the drawings attached.

DETAILED DESCRIPTION OF DIFFERENT EMBODIMENTS

Figure 1:
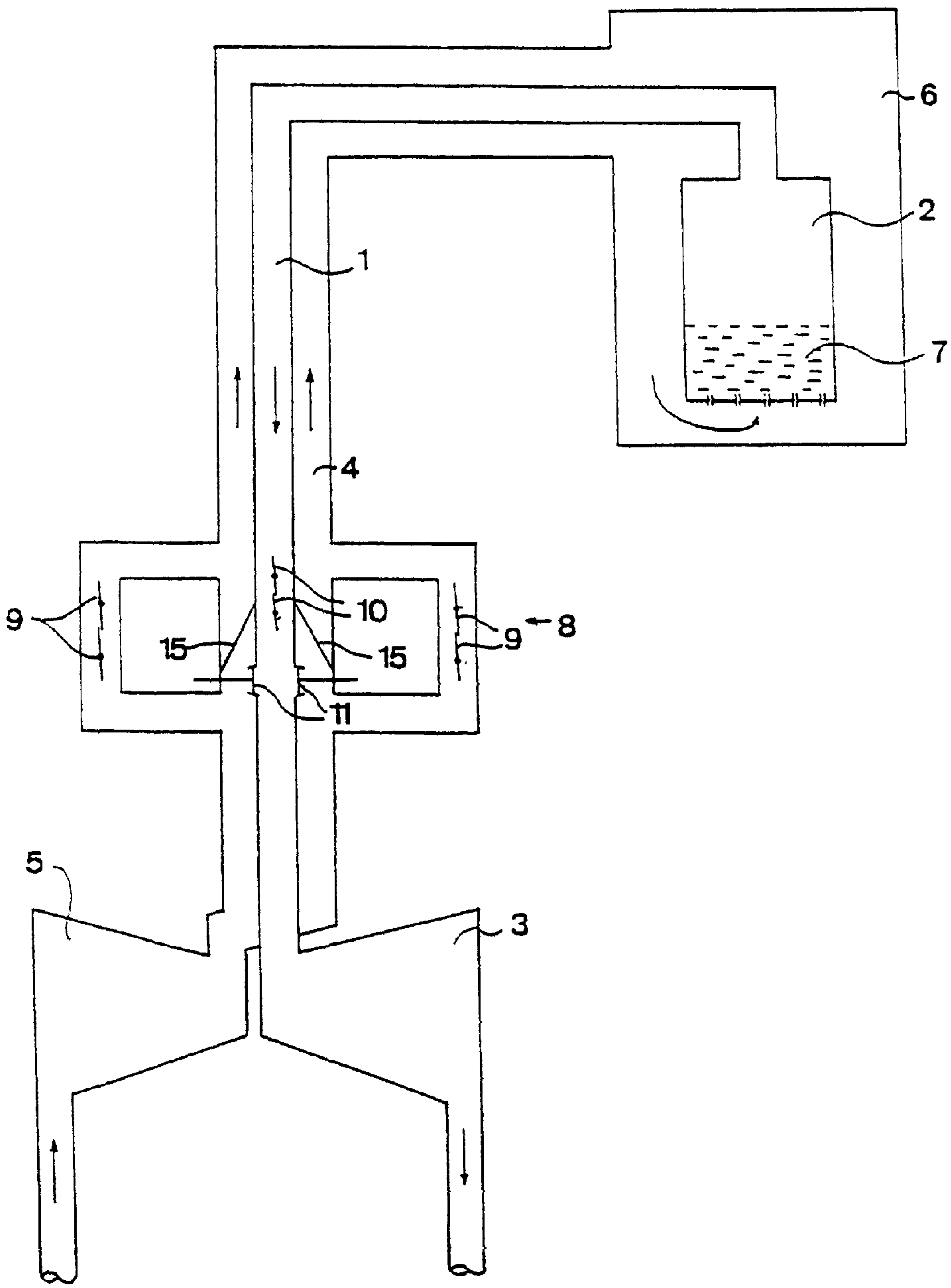
FIG. 1 discloses schematically a combustion plant having a valve device according to an embodiment of the invention.

FIG. 1 discloses schematically a combustion plant having a channel arrangement comprising an inner channel 1 which extends in a longitudinal direction a and forms a hot gas channel conveying combustion gases from a pressurized combustion chamber 2 to a gas turbine 3. Furthermore, the channel arrangement comprises an outer channel 4 having an annular cross-section and enclosing the inner channel 1. The outer channel 4 is intended for a second fluid and forms an air channel for the supply of pressurized combustion air or oxygen-containing gas from a compressor 5 to a pressure vessel 6 and the combustion chamber 2 enclosed therein. In the example disclosed, the pressurized combustion chamber 2 comprises a pressurized fluidized bed 7, the pressurized air being supplied to the bed 7 through schematically disclosed nozzles at the bottom of the combustion chamber 2, thereby providing a fluidization of the bed 7. The air flowing in the air channel 4 has a temperature of about 200–400° C. and a pressure of about 15–17 bar (abs) while the combustion gas flowing in the hot gas channel has a temperature of about 800–900° C. and a pressure which is about 0.5 bar lower than the pressure in the air channel 4.

Figure 2:
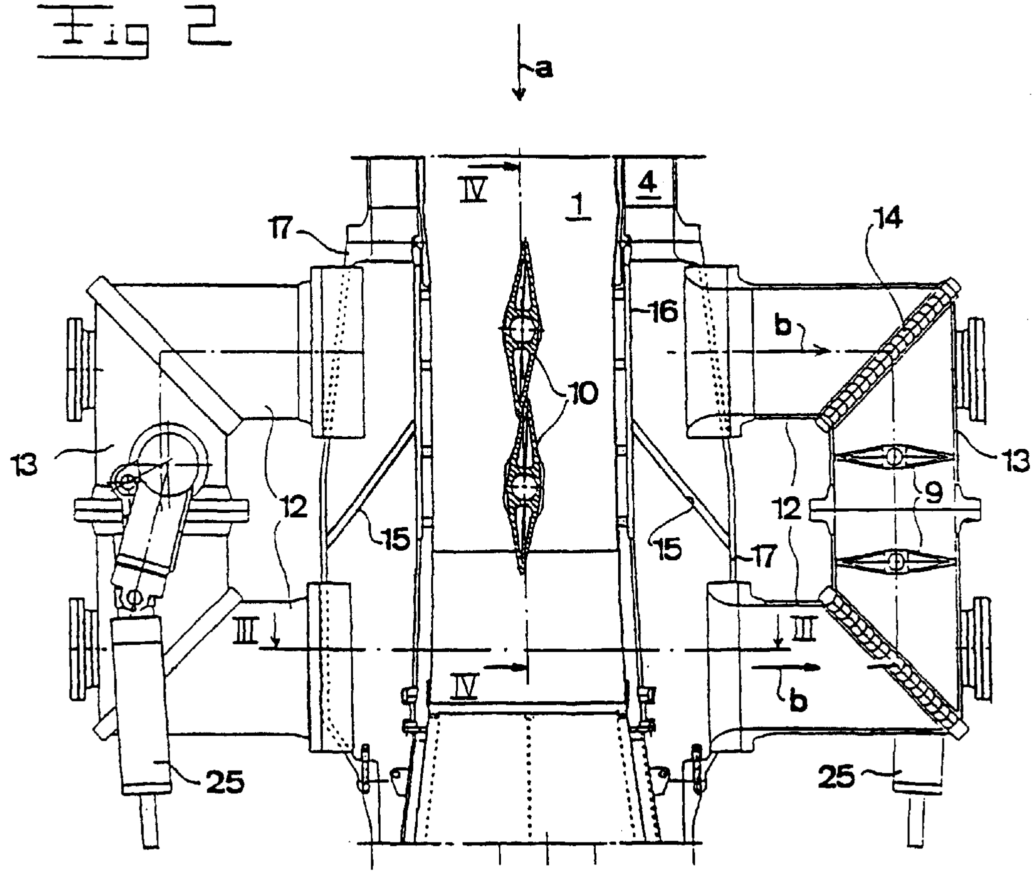
FIG. 2 discloses a sectional view of the valve device in FIG. 1.
Figure 3:
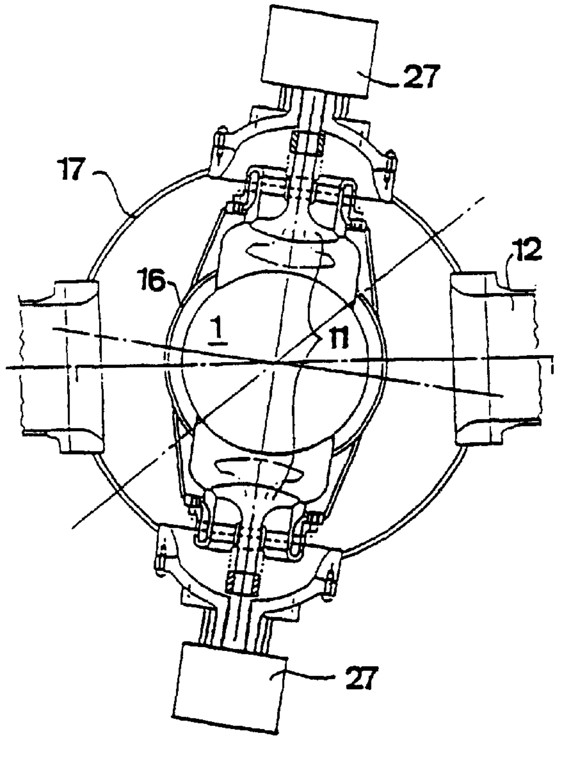
FIG. 3 discloses a sectional view along the line III—III in FIG. 2.

The channel arrangement comprises a valve device 8 which is disclosed more closely in FIGS. 2 and 3. The valve device 8 comprises first valves 9, which are provided to enable the interception of the air flow through the air channel 4, second valves 10, which are provided to enable the interception of the hot gas flow through the hot gas channel 1 and third valves 11 (see FIG. 3) which are arranged to open a connection between the air channel 4 and the hot gas channel 1. The third valves 11 are provided upstream of the first valves in the air channel 4 and downstream of the second valves 10 in the hot gas channel 1. If the first valves 9 and the second valves 10 are open and the third valves 11 closed, hot gas may thus flow freely through the hot gas channel 1 and the pressurized combustion air through the air channel 4. If the first valves 9 and the second valves 10 are closed, these flows are hindered. If these flows have to be stopped quickly, it is essential that the third valves 11 may be opened simultaneously in order to convey the pressurized air directly to the gas turbine 3 so that the compressor 5 and the gas turbine 3 are not destroyed.

The valve device 8 comprises two U-shaped channel portions of the annular air channel 4, each comprising two pipe portions 12 which extend outwardly with regard to the hot gas channel 1 and an intermediate pipe portion 13 connecting the pipe portions 12 extending outwardly. The pipe portions 12 extend radially outwardly in a direction b forming an essentially right angle to the longitudinal direction a of the heat gas channel 1. It is to be noted that the direction b, according to the invention, may deviate from a radial direction in such a manner that it approaches a tangential direction. Moreover, the direction b may be inclined with regard to the direction a. The intermediate pipe portions 13 extend in a direction being essentially parallel to the longitudinal direction a of the hot gas channel 1. In the channel bow formed between the intermediate pipe portions, 13 and the pipe portions 12, guide blades 14 are provided to reduce the flow resistance in the U-shaped channel portions. The U-shaped channel portions are provided symmetrically with regard to the hot gas channel 1 and the air channel 4, i.e. they are provided at the same height, extend equally far and have an essentially identical shape. It is also to be noted that the U-shaped channel portions 12, 13 may have curved shape, e.g. a semi-circular shape. In order to force the combustion air to flow through the U-shaped channel portions, the valve device 8 comprises a closure wall 15 provided in the annular air channel 4 between the two outwardly extending pipe portions 12 of each U-shaped channel portion. The closure wall 15 has a conical shape and extends around the hot gas channel 1 between an inner wall 16 separating the hot gas channel 1 and the air channel 4, and an outer wall 17 which delimits the air channel 4 outwardly and through which the pipe portions 12 extend. The pipe portions 12 shall have such a length that no essential tensions due to the temperature arise in said channel bows and intermediate pipe portions 13.

Figure 4:
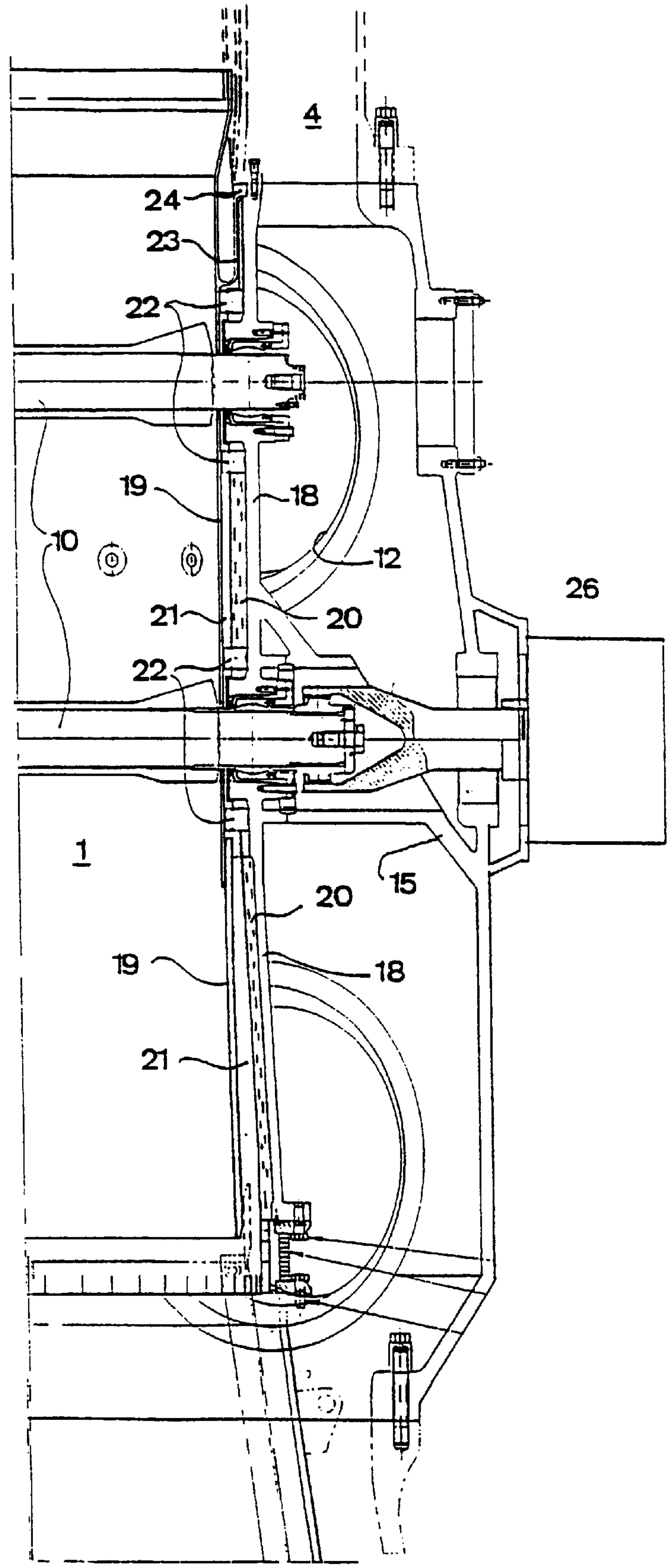
FIG. 4 discloses a sectional view along the line IV—IV in FIG. 2.
Figure 5:
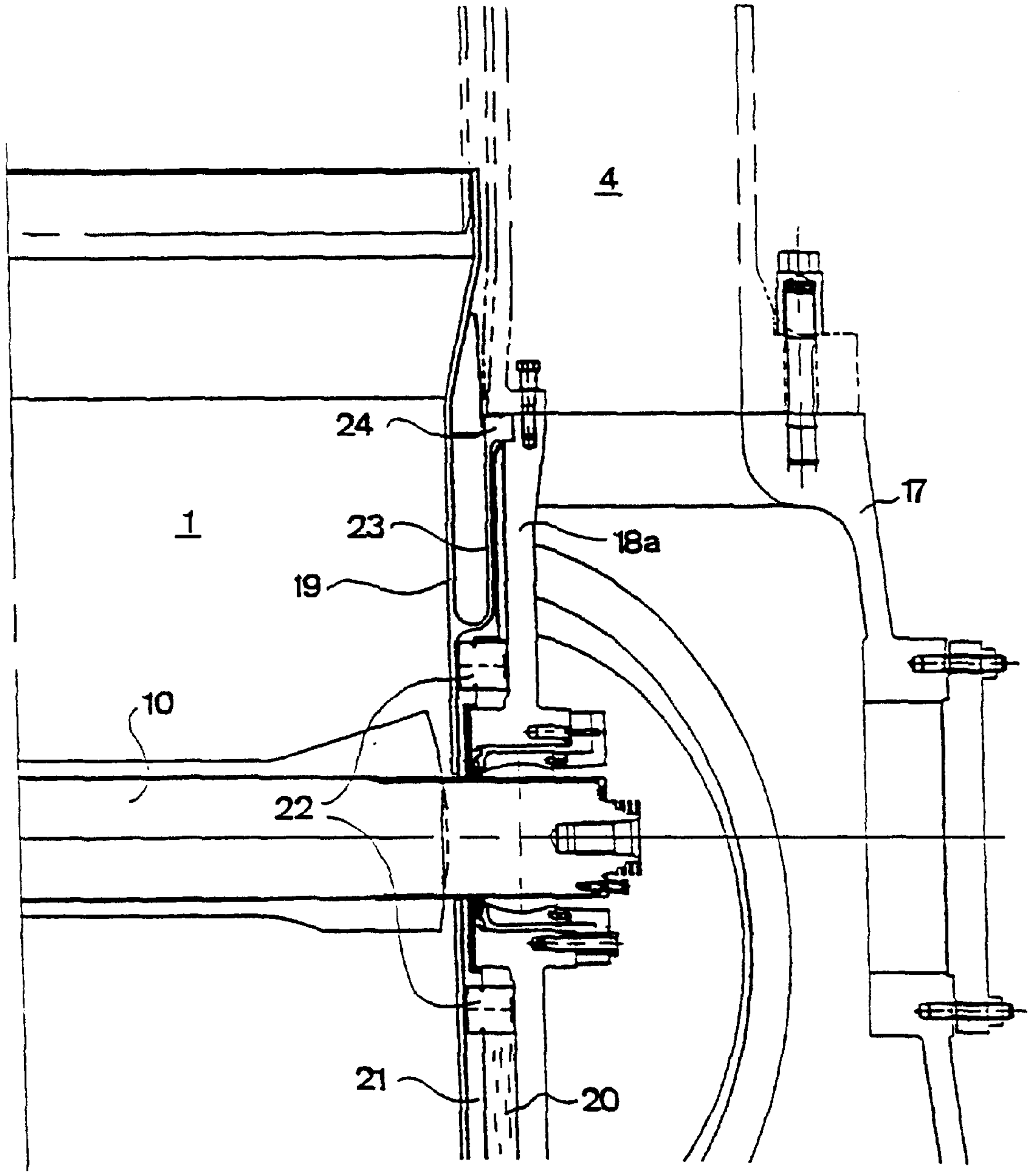
FIG. 5 discloses an enlarged part of the sectional view in FIG. 4.

The inner wall 16, see FIGS. 4 and 5, comprises an outer wall element 18, which is arranged to absorb the pressure difference existing between the hot gas channel 1 and the air channel 4, and an inner wall element 19, which is arranged to form a protective layer against the hot gas fluid in the hot gas channel 1. A heat-insulating layer 20 is provided between the outer and the inner wall elements 18 and 19 and fixedly connected to the outer wall element 18. The inner wall element 19 which -is designed as a protective sheet of a temperature-resistive material, thus prevents the flowing hot gas from direct contact with the heat-insulating layer 20 and the outer wall element 18. Between the inner wall element 19 and the heat-insulating layer 20, there is in addition a space 21 and annular support elements 22 extending around the inner wall element 19 and arranged to support the inner wall element 19 when it has its largest size. The heat-insulating layer is attached to the outer wall element 18 by means of thin sheets extending between and being connected to the annular support elements 22.

The inner wall element 19 is connected to the outer wall element 18 by means of a connection (see FIG. 5) which permits the inner wall element 19 to be movable in relation to the outer wall element 18. The connection comprises a flange 23 which is fixedly connected to and extends around the inner wall element 19. The flange 23 is, in the example disclosed, manufactured in one piece together with the inner wall element 19. The flange 23 extends radially outwardly and is bent upwardly in such a manner that it is essentially parallel to the inner wall element 19. An upper part of the flange 23 comprises a heel-like member 24 extending around the inner wall element 19 and being fastened in a recess between two wall portions 18*a* and 18*b* of the outer wall element 18. By such an attachment flange 23, it is possible for the inner wall element 19 to expand outwardly when the temperature thereof is higher than the temperature of the outer wall element 18 due to the hot gas.

In each of the intermediate pipe portions 13, two of said first valves 9 are provided. Each of these first valves 9 comprises a valve disc which is rotatable about a rotational axis extending through the respective intermediate pipe portion 13 and being essentially perpendicular to the longitudinal direction a of the hot gas channel 1. By two such first valves 9 in series, the security is improved since merely the function of one of these is necessary for intercepting the air flow from the compressor 5. Each of the first valves 9 is controlled by means of a respective adjustment member 25, see FIG. 2.

In the hot gas channel 1, two of said second valves 10 are provided in series with each other. Each of the second valves 10 comprises a valve disc which is journalled in the outer wall element 18 and rotatable about a rotational axis extending through the hot gas channel 1 in a direction being essentially perpendicular to the longitudinal direction a of the hot gas channel 1. Each of the second valves 10 is controlled by means of a respective adjustment member 26, one of which is disclosed schematically in FIG. 4. The bearing of the second valves 10 is cooled by means of cooling channels connecting the air channel 4 and the hot gas channel 1. Since the pressure is higher in the air channel 4, a cooling air flow is obtained through these channels in the manner disclosed in WO 97/02436.

As appears from FIG. 3, the valve device 8 comprises two third valves 11, which each comprises a cone valve being axially displaceable by means of a respective adjustment member 27 in a direction which is essentially perpendicular to the longitudinal direction a of the hot gas channel 1.

Figure 6:
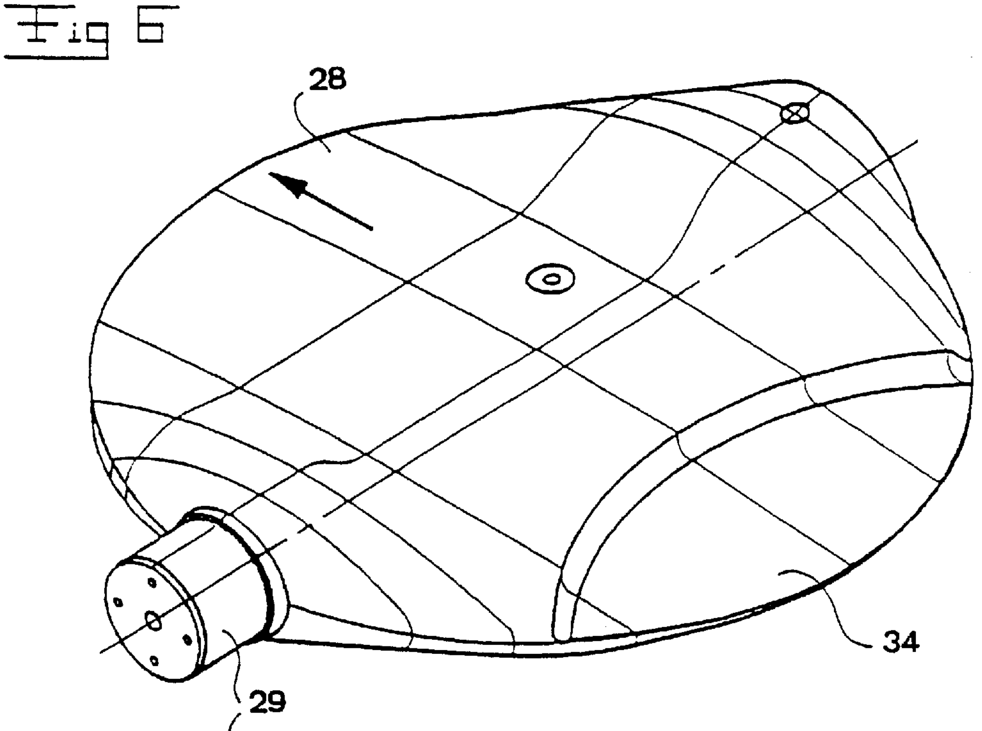
FIG. 6 discloses a perspective view of a valve disc of the valve device in FIG. 2.
Figure 7:
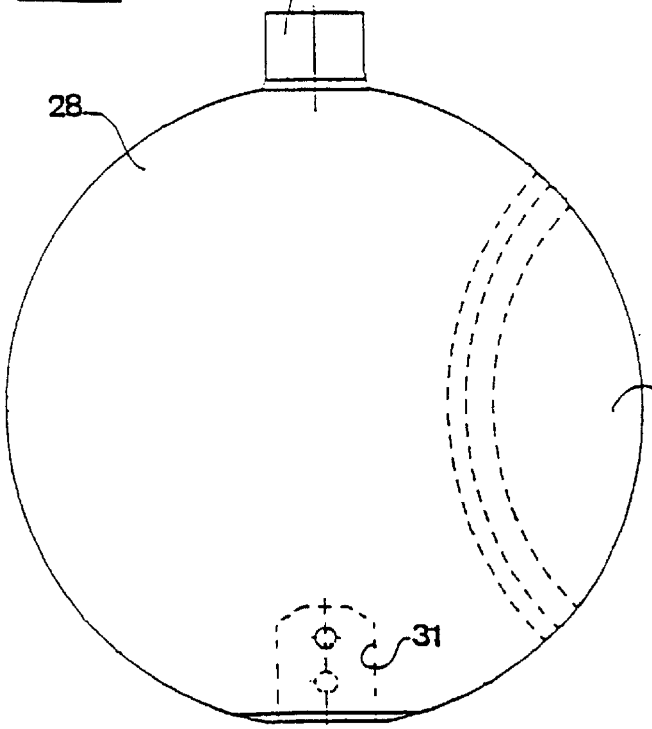
FIG. 7 disclosed a view from above of the valve disc in FIG. 6.
Figure 8:
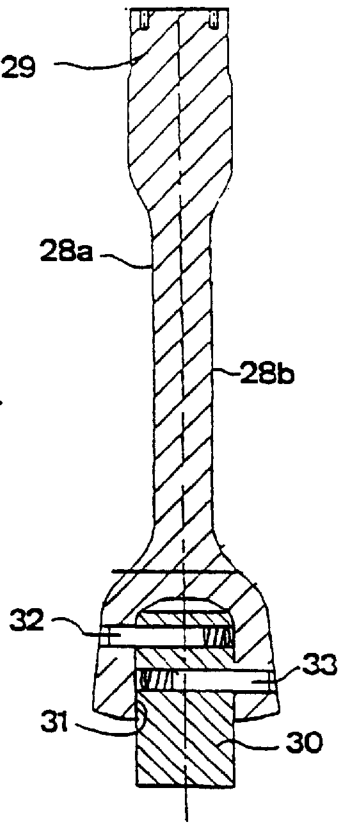
FIG. 8 discloses a sectional view through the valve disc along the line VIII—VIII in FIG. 7.

In FIGS. 6–8, a valve disc 28 for one of the first valves 9 is disclosed. The valve disc 28 is rotatably journalled in the intermediate pipe portion 13 by means of a first shaft pin 29 and a second shaft pin 30. The first shaft pin 29 is fixedly provided on the valve disc 28 whereas the second shaft pin 30 is loosely or demountably provided on the valve disc 28. In the example disclosed, the valve disc 28 and the first shaft pin 29 are manufactured in one piece with each other. Essentially diametrically opposite to the first shaft pin 29, the valve disc 28 comprises a recess 31 into which the second releasable shaft pin 30 is insertable. The valve disc 28 comprises an upper side 28*a*, which is arranged to face against the direction of the flow, and an opposite bottom side 28*b*, which is arranged to face the direction of the flow. The second releasable shaft pin 30 is attachable in the recess 31 by means of a first bolt member 32, which extends from the upper side 28*a*, and a second bolt member 33, which extends from the bottom side 28*b*. Due to the fact that the first bolt member 32 is located closer to the centre of the valve disc 28 than the second bolt member 33, the bending stress to the valve disc 28 due to the flow is reduced.

By providing the valve disc 28 with a fixed and a releasable shaft pin 29, 30 in this manner, the valve disc may be as thin as possible without the need for the provision of a dividing joint of the pipe portion 13 in the plane in which the rotational axis of the valve disc 28 is located. The valve disc 28 is mounted in such a manner that the releasable shaft pin 30 is removed and thereafter it is possible to roll the valve disc 28 into the pipe portion 30 and to lead the fixed shaft pin 29 out through its bearing aperture. Thereafter, the valve disc 28 is positioned in the proper position and the releasable shaft pin 30 is inserted into the recess 31 through the bearing aperture of the releasable shaft pin 30. Thereafter, the releasable shaft pin 30 is attached by means of the screws 32 and 33.

Figure 9:
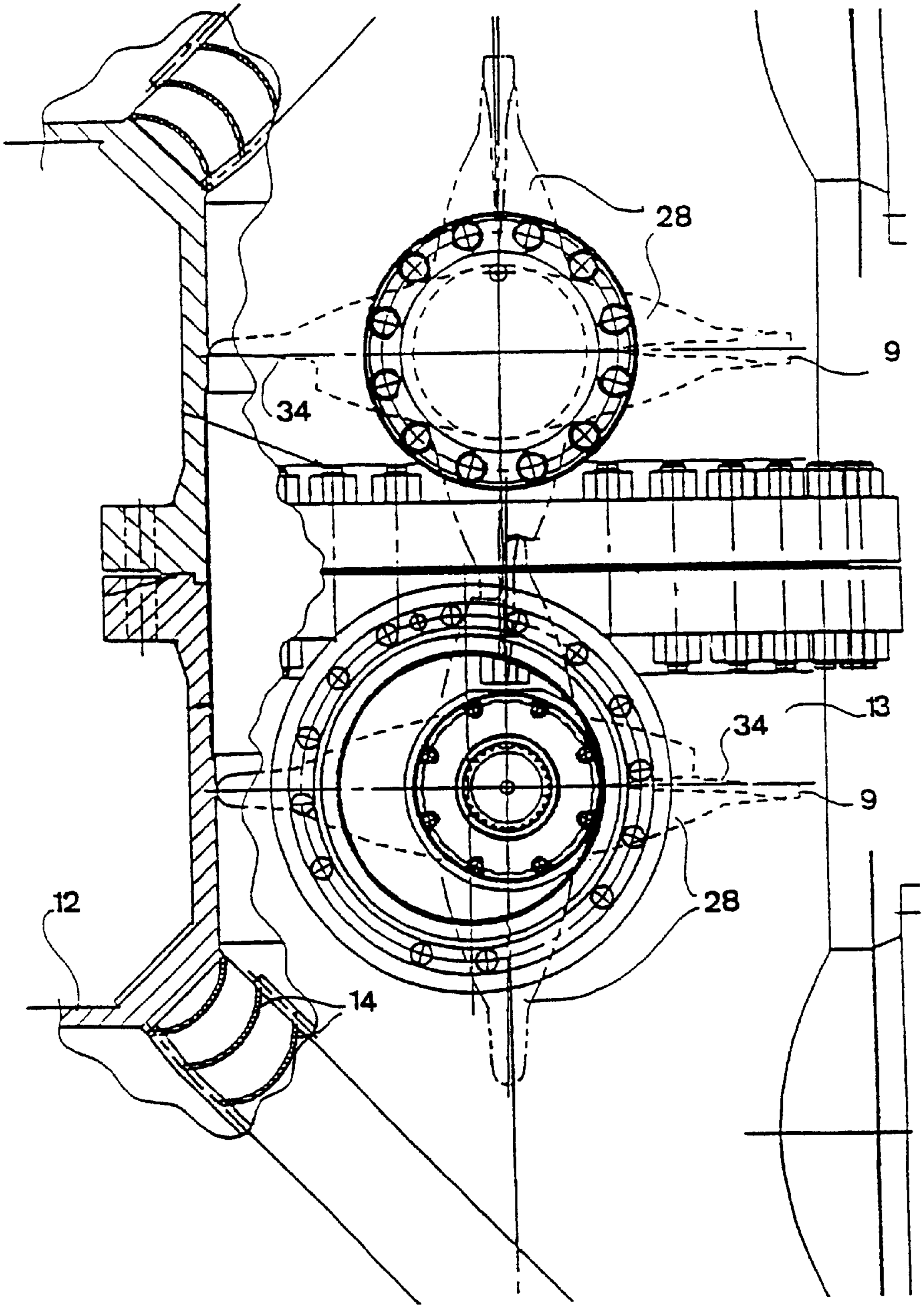
FIG. 9 discloses an enlarged part of the sectional view in FIG. 2.

In FIG. 9, the first valves 9 are disclosed as two successively provided valve discs 28. Each valve disc 28 comprises a depression 34 (see also FIGS. 6 and 7). The depression 34 of one of the valve discs 28 is arranged to engage the depression 34 of the other valve disc 28 when the valve discs 28 are located at their open positions. The depressions 34 of the two successively provided valve discs 28 are provided in such a manner that the depression 34 of one of the valve discs 28 is provided on the upper side 28*a* whereas the depression 34 of the other valve disc 28 is provided at the bottom side 28*b*. Consequently, when the two valve discs 28 are located in their open position and the depressions 34 engage each other, the valve discs 28 will be provided in such a manner that their disc plane is essentially parallel to the longitudinal direction of the intermediate pipe portion 13.

The present invention is not delimited to the embodiments disclosed above but may be varied and modified within the scope of the following claims.

It is also possible to provide the valve discs of the second valves 10 with such depressions 34 which are provided on the valve disc 28 of the first valves 9.

Although the valve device according to the present invention has been described in connection with a PFBC-plant, it is to be noted that this valve device may be utilized for all sorts of gas turbine plants having external combustion, i.e. the combustion is performed in a combustion chamber being separated from the gas turbine.

What is claimed is:

1. A valve device for a channel arrangement, comprising: an inner channel, which extends in a longitudinal direction and is intended for a first fluid, an outer channel, which encloses said inner channel and is intended for a second fluid having a low temperature in relation to said first fluid, said valve device comprising at least two first valves provided to enable the interception of a flow through said outer channel, wherein said outer channel comprises two U-shaped channel portions, each extending outwardly with regard to said inner channel and each comprising at least one of said first valves, and a valve disc within each of said first valves which is rotatable about a rotational axis.

2. A valve device according to claim 1, wherein said U-shaped channel portions are provided symmetrically with regard to said inner channel.

3. A valve device according to claim 1, wherein each said channel portion comprises two radial pipe portions, which extend outwardly with regard to said inner channel, and an intermediate pipe portion, which connects said radial pipe portion extending outwardly; and said at least two first valves are provided in each of said intermediate portions.

4. A valve device according to claim 3, wherein said two radial pipe portions extend in a direction forming an essentially right angle to the longitudinal direction of said inner channel.

5. A valve device according to claim 1, wherein said intermediate pipe portions extend in a direction being essentially parallel to the longitudinal direction of said inner channel.

6. A valve device according to claim 1, wherein a closure wall is provided in said outer channel between said two radial pipe portions of each of said U-shaped channel portions and said closure wall has a conical shape.

7. A valve device according to claim 1, wherein said outer channel is arranged to convey said second fluid at a pressure being higher than the pressure of said inner channel.

8. A valve device according to claim 1, wherein said inner channel and said outer channel are separated by a channel wall comprising an outer wall element and an inner wall element.

9. A valve device according to claim 8, wherein said outer wall element is arranged to absorb the pressure difference existing between said inner channel and said outer channel.

10. A valve device according to claim 8, wherein said inner wall element is arranged to form a protective layer against said first fluid in said inner channel.

11. A valve device according to claim 8, wherein a heat-insulating layer is provided between said inner and said outer wall elements.

12. A valve device according to claim 8, wherein said inner wall element is connected to said outer wall element by means of a connection permitting a movement of said inner wall element in relation to said outer wall element.

13. A valve device according to claim 1, wherein at least one second valve is provided to enable the interception of a flow through said inner channel.

14. A valve device according to claim 12, wherein at least a third valve, arranged to open a connection between said outer channel and said inner channel, is provided upstream of said first valves, in said outer channels, and downstream of said second valve, in said inner channel.

15. A valve device according to claim 3, wherein at least one of said first valves comprises a valve disc, which is rotatably journalled in said intermediate pipe portion by means of a first and a second shaft pin.

16. A valve device according to claim 15, wherein said first shaft pin is fixedly attached to said valve disc, while said second shaft pin is loosely attached to said valve disc.

17. A valve device according to claim 16, wherein said first shaft pin and said valve disc are manufactured in one piece.

18. A valve device according to claim 16, wherein said valve disc comprises a recess in which said second shaft pin is insertable.

19. A valve device according to claim 18, wherein said valve disc comprises an upper side arranged to face towards the direction of a flow and an opposite bottom side arranged to face in the direction of the flow; said second shaft pin is attachable to said recess, by means of a first bolt member extending from the upper side, and a second bolt member extending from the bottom side; and said first bolt member is located more closely to the center of said valve disc than said second bolt member.

20. A valve device according to claim 15, wherein at least one of said first valves comprises two said valve discs provided successively and each of said valve discs comprising a depression arranged to engage said depression of said other valve disc, when said valve discs are located in their open positions.

21. A valve device according to claim 20, wherein said depressions of said two successive valve discs are provided in such a manner that said depression of one of said valve discs is provided on an upper side, arranged to face towards the direction of a flow, and said depression of the other of said valve discs, on a bottom side, is arranged to face in the direction of the flow.

* * * * *